US010533847B2

(12) United States Patent
Su et al.

(10) Patent No.: US 10,533,847 B2
(45) Date of Patent: Jan. 14, 2020

(54) INSPECTION MECHANISM FOR METAL BLANK

(71) Applicant: FACTORY AUTOMATION TECHNOLOGY CO., LTD., Chiayi County (TW)

(72) Inventors: Po Cheng Su, Chiayi County (TW); Hsin Hong Hou, Chiayi County (TW); Kuo Hsiu Chen, Chiayi County (TW); Shun Yu Yang, Chiayi County (TW)

(73) Assignee: FACTORY AUTOMATION TECHNOLOGY CO., LTD., Chiayi County (TW)

( * ) Notice: Subject to any disclaimer, the term of this patent is extended or adjusted under 35 U.S.C. 154(b) by 127 days.

(21) Appl. No.: 15/916,276

(22) Filed: Mar. 8, 2018

(65) Prior Publication Data

US 2018/0259325 A1 Sep. 13, 2018

(30) Foreign Application Priority Data

Mar. 9, 2017 (TW) .............................. 106203371 U

(51) Int. Cl.
| | |
|---|---|
| *G01B 11/25* | (2006.01) |
| *G01B 5/00* | (2006.01) |
| *B21C 51/00* | (2006.01) |
| *G01Q 10/04* | (2010.01) |
| *B21K 1/28* | (2006.01) |

(52) U.S. Cl.
CPC .......... *G01B 11/2518* (2013.01); *B21C 51/00* (2013.01); *G01B 5/0007* (2013.01); *G01Q 10/04* (2013.01); *B21K 1/28* (2013.01); *G01B 5/0025* (2013.01)

(58) Field of Classification Search
CPC ... G01B 11/2518; G01B 5/0007; B21C 51/00; G01Q 10/04
USPC ......................................................... 73/865.8
See application file for complete search history.

(56) References Cited

U.S. PATENT DOCUMENTS

| 4,562,392 A | * | 12/1985 | Davis ..................... G01B 21/10 |
| | | | 318/39 |
| 6,016,695 A | * | 1/2000 | Reynolds .............. B60C 25/132 |
| | | | 73/146 |
| 2010/0013913 A1 | * | 1/2010 | Vignoli ............... B60C 25/0554 |
| | | | 348/61 |

FOREIGN PATENT DOCUMENTS

| CN | 103196386 A | * | 7/2013 | ............. G01B 11/24 |
| CN | 106289074 A | * | 1/2017 | ............... B07C 5/10 |

OTHER PUBLICATIONS

English abstract of CN103196383 from espacenet (Year: 2019).*
English abstract of CN106289074 from espacenet (Year: 2019).*

* cited by examiner

*Primary Examiner* — Nimeshkumar D Patel
*Assistant Examiner* — Jean F Morello
(74) *Attorney, Agent, or Firm* — Raymond Y. Chan; David and Raymond Patent Firm

(57) ABSTRACT

An inspection mechanism for metal blank, adapted for sensing the surface condition of a metal blank, includes a framework, a holding device, a shuffling device, and an inductive control device. It mainly utilizes the inductive control device to drive the holding device to hold and position the metal blank and control the shuffling device to move the sensor of the inductive control device to the path of sensing the metal blank, so as to conduct the sensing operation.

2 Claims, 7 Drawing Sheets

INSPECTION MECHANISM FOR METAL BLANK

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an inspection mechanism for metal blank, and more particularly to an inspection mechanism for metal blank that can sense the surface of a metal blank to obtain the size and feature information thereof.

Description of Related Arts

In a mass production process of metal article, a metal blank is usually form first through forging or other method. Nevertheless, the metal blanks made by molding may have certain size differences between batches due to mold wear, size error of the mold, shrinkage ratio of the materials, and etc. Such size difference or deviation of the metal blank often causes inconsistent quality to subsequent processes. Hence, the way to sense the dimensions of the metal blank for obtaining related information before processing is critical. Unfortunately, there has not been device for conducting such detection. Therefore, the present invention is to provide an inspection mechanism for metal blank.

SUMMARY OF THE PRESENT INVENTION

Therefore, an object of the present invention is to provide an inspection mechanism for metal blank for sensing the size of a metal blank.

Therefore, the inspection mechanism for metal blank provided by the present invention is for sensing the surface condition of a metal blank. The inspection mechanism comprises a framework, a holding device, a shuffling device, and an inductive control device. The framework comprises a platform and a foot unit arranged next to the platform. The holding device is arranged on the platform for holding the metal blank. The shuffling device comprises a lateral rail arranged on the foot unit, a perpendicular rail slidably arranged on the lateral rail, and a base arranged on the perpendicular rail, wherein the base is adaptable for controllably horizontally and vertically move along the lateral rail and the perpendicular rail. The inductive control device comprises a controller and a sensor arranged on the base, wherein the controller is electrically connected with the holding device, the base, and the sensor, so as to control the actuation of the holding device and the horizontal and vertical moving distance of the base and to record the value of the surface condition of the metal blank sensed by the sensor.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
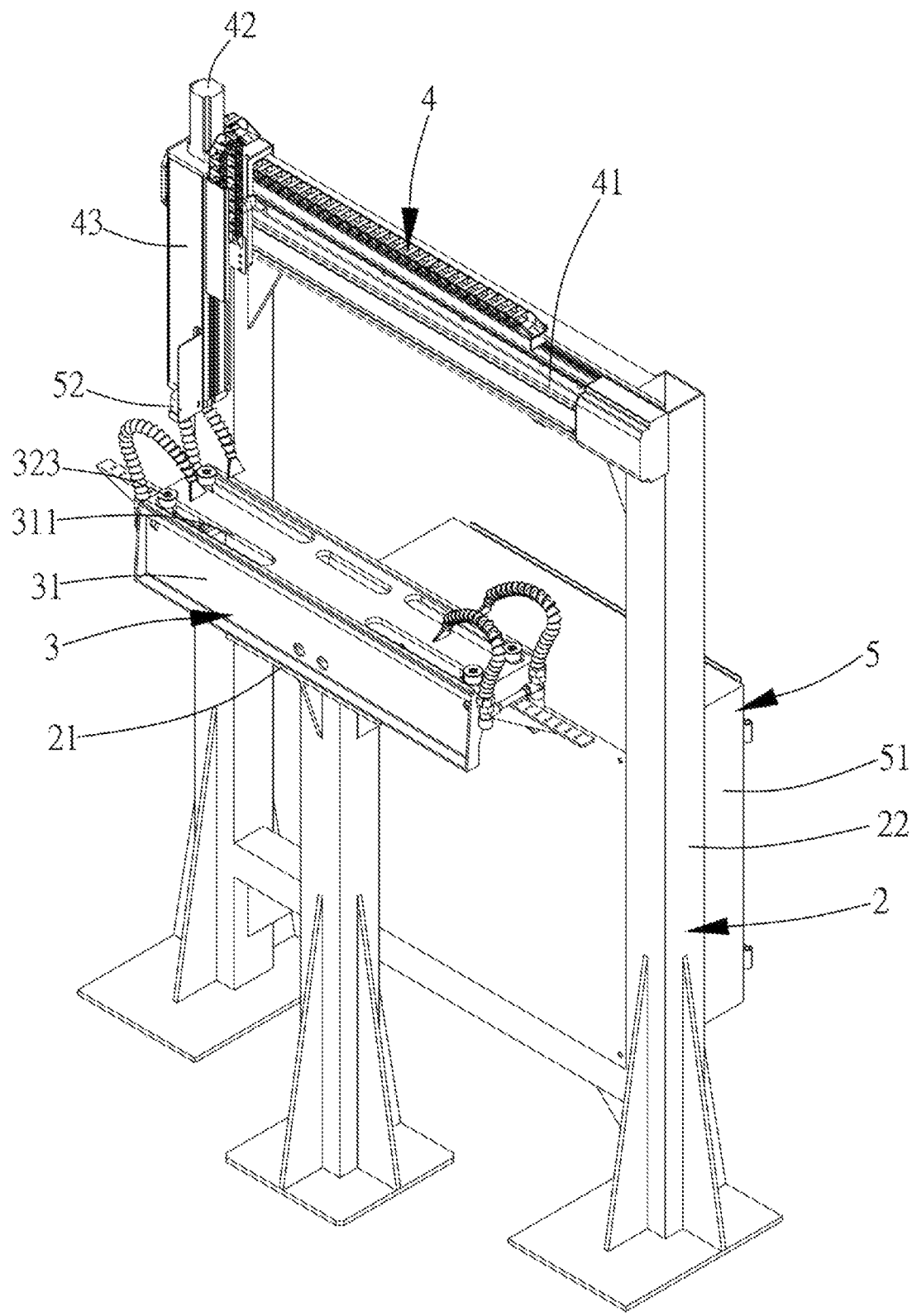
FIG. 1 is a perspective view of the inspection mechanism for metal blank according to a preferred embodiment of the present invention.
Figure 2:
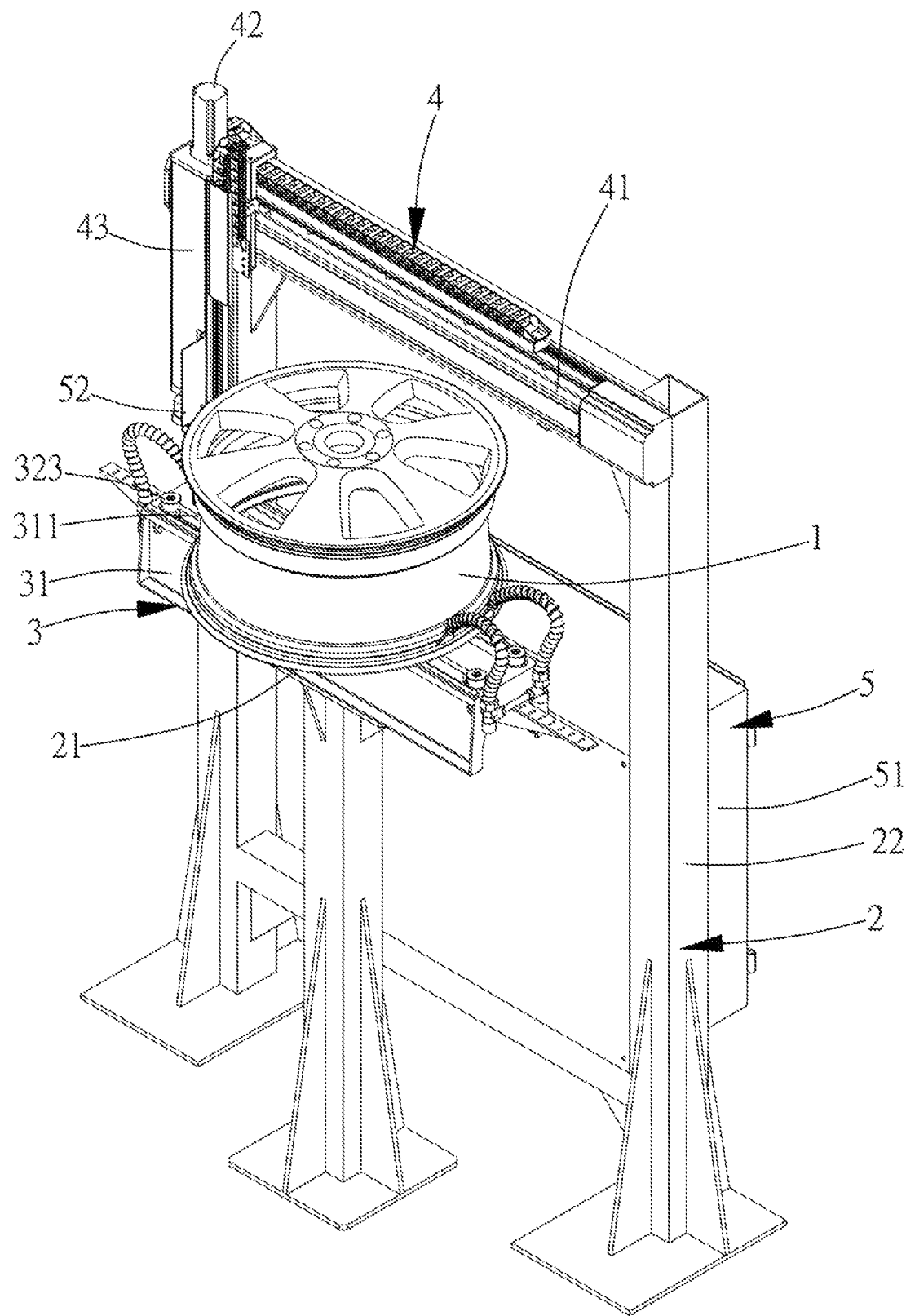
FIG. 2 is a perspective view illustrating a metal blank placed on the inspection mechanism according to the above preferred embodiment of the present invention.
Figure 3:
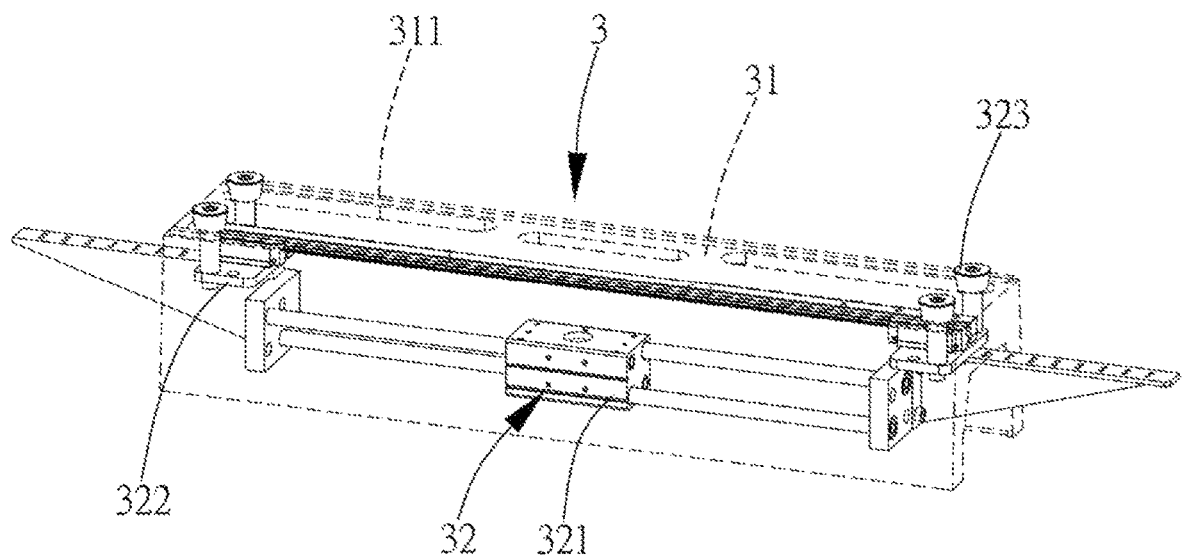
FIG. 3 is a perspective view of the holding device of the inspection mechanism for metal blank according to the above preferred embodiment of the present invention.
Figure 4:
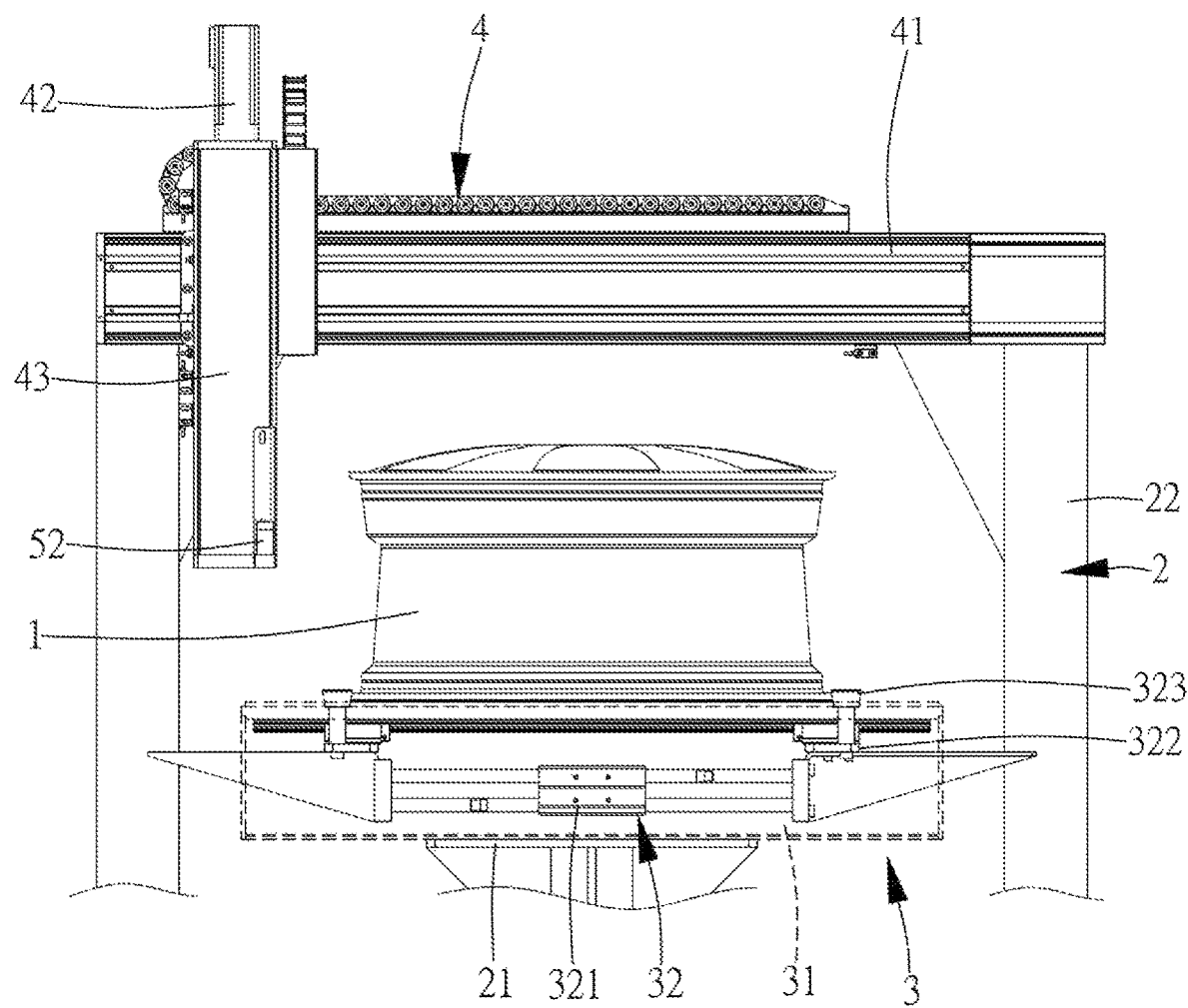
FIG. 4 is a front perspective view of part of the inspection mechanism for metal blank according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1-4, according to a preferred embodiment of the present invention, the inspection mechanism for metal blank is for sensing the surface condition of a metal blank 1, so as to detect the size deviation of the metal blank 1 for facilitating the parameter settings of subsequent processes. The metal blank 1 is embodied as a wheel here, but the present invention should not be limited thereto. The inspection mechanism comprises a framework 2, a holding device 3, a shuffling device 4, and an inductive control device 5.

The framework 2 comprises a platform 21 and a foot unit 22 arranged next to the platform 21. The holding device 3 is arranged on the platform 21 and comprises a shelf 31 arranged on the platform 21 and a holder 32 arranged under the shelf 31. The shelf 31 has four slots 311 provided thereon. The holder 32 comprises a telescopic cylinder 321, two connectors 322 arranged on the two sides of the telescopic cylinder 321 respectively, and four holding posts 323 separately arranged on the two connectors 322. Each holding post 323 protrudes from the surface of the shelf 31 from a corresponding slot 311. When the metal blank 1 is placed on the shelf 31, the telescopic cylinder 321 is adapted for driving the four holding posts 323 to move to or from one another so as to hold or release the metal blank 1. The shuffling device 4 comprises a lateral rail 41 arranged on the foot unit 22, a perpendicular rail 42 slidably arranged on the lateral rail 41, and a base 43 arranged on the perpendicular rail 42, wherein the base 43 is adaptable for controllably horizontally and vertically move along the lateral rail 41 and the perpendicular rail 42. The inductive control device 5 is arranged on the foot unit 22 and comprises a controller 51 and a sensor 52 arranged under the base 43 of the shuffling device 4. The controller 51 is electrically connected with the telescopic cylinder 321 of the holding device 3, the base 43 of the shuffling device 4, and the sensor 52, so as to control the actuation of the telescopic cylinder 321 and the moving distance of the base 43 along the lateral rail 41 and the perpendicular rail 42 and to record the value of the surface condition of the metal blank 1 sensed by the sensor 52.

Figure 5:
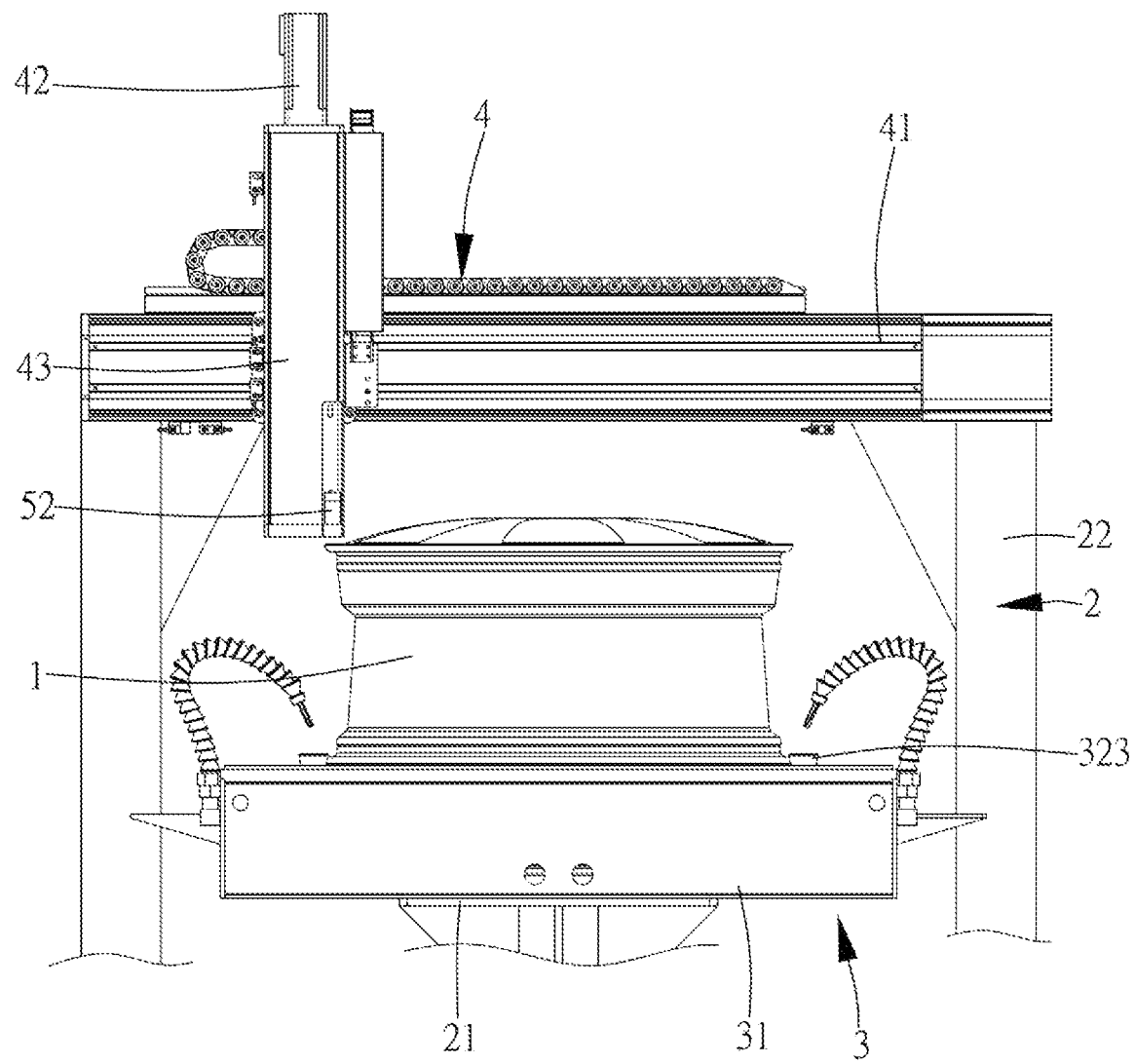
FIG. 5 is a perspective view illustrating a movement of the inspection mechanism for metal blank according to the above preferred embodiment of the present invention.
Figure 6:
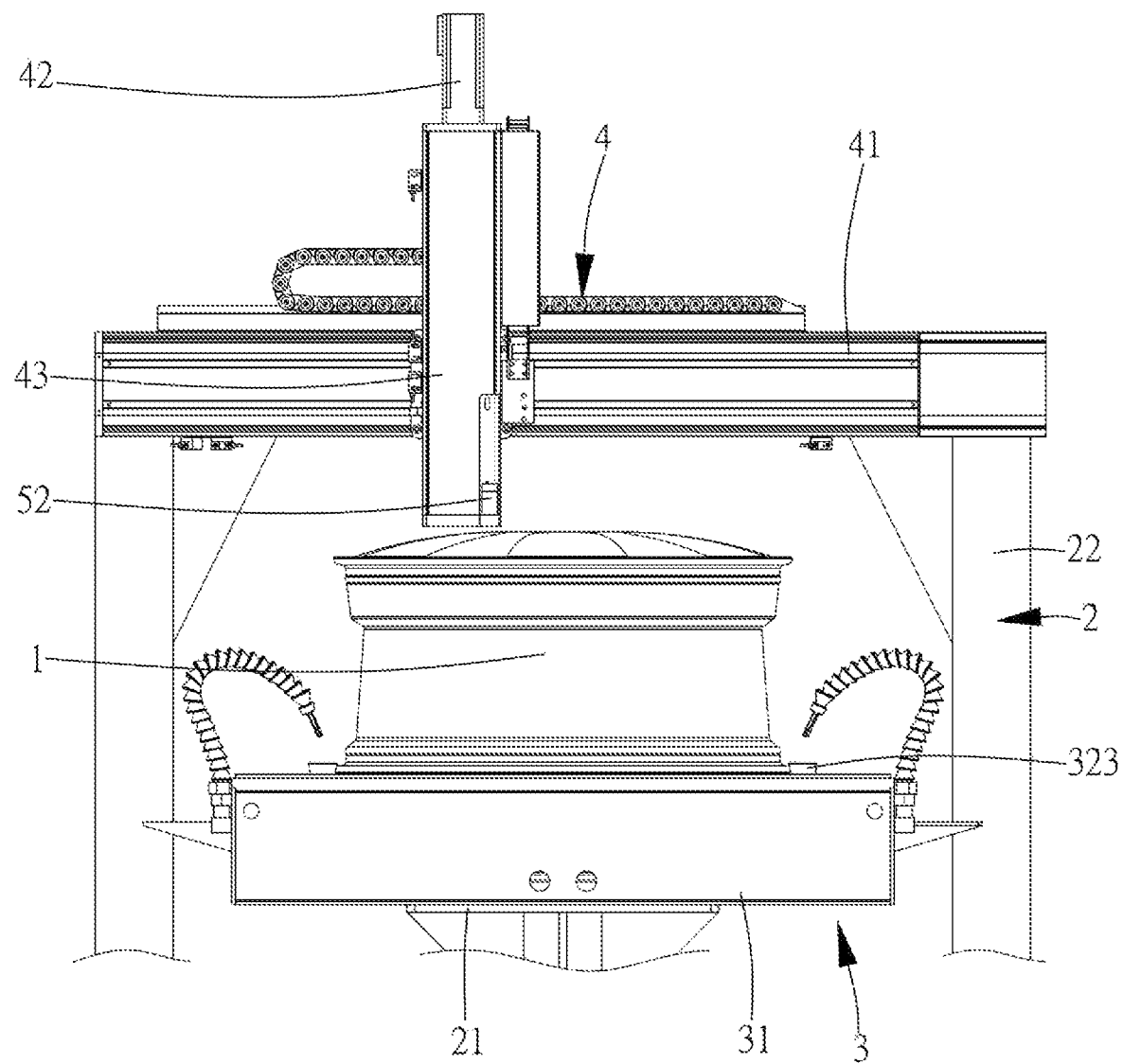
FIG. 6 is a perspective view illustrating another movement of the inspection mechanism for metal blank according to the above preferred embodiment of the present invention.
Figure 7:
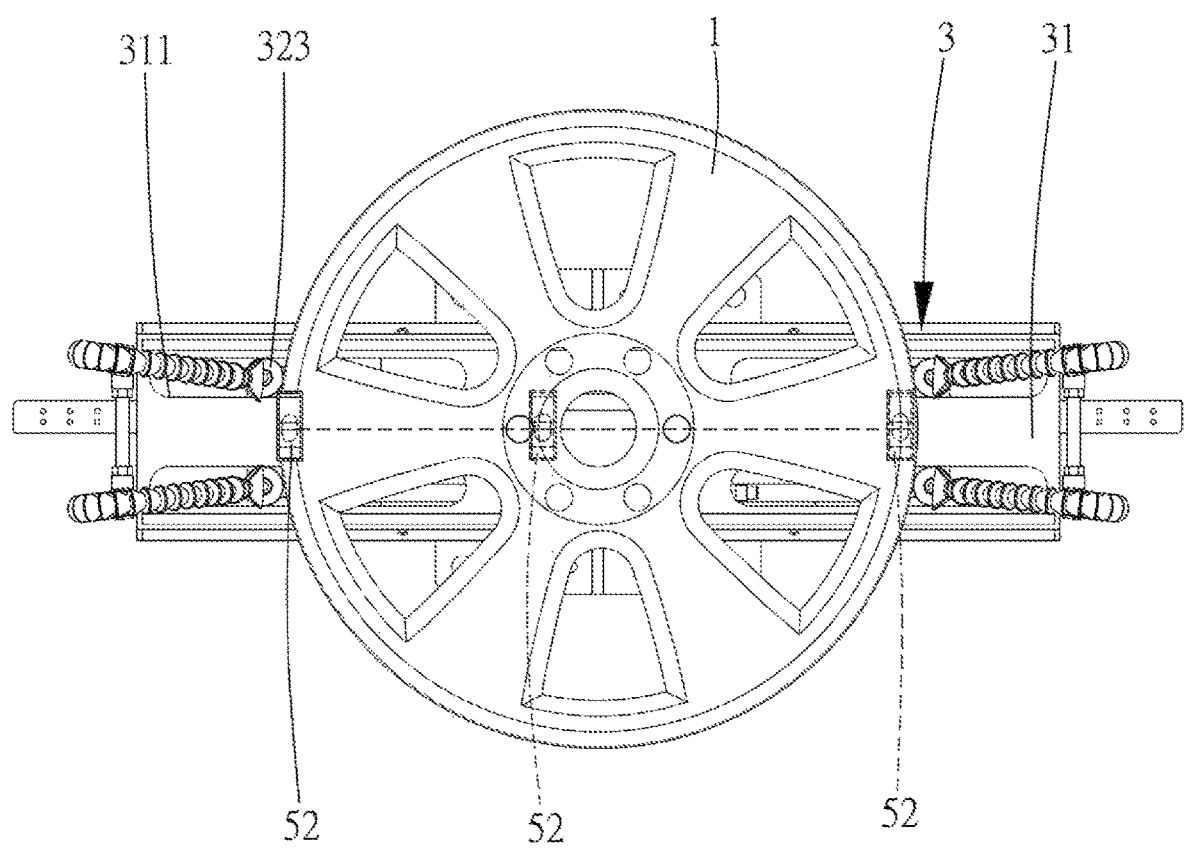
FIG. 7 is a top perspective view illustrating a movement of the inspection mechanism for metal blank according to the above preferred embodiment of the present invention.

Referring to FIGS. 5-7, according to the present invention, when the inspection mechanism is utilized to sense the metal blank 1, one has to first put the metal blank 1 for sensing on the shelf 31, and the controller 51 can drive the telescopic cylinder 321 to actuate and bring the four holding posts 323 to hold the metal blank 1. Then, the controller 51 can control the moving distances of the base 43 on the lateral rail 41 and the perpendicular rail 42, so as to move it to a starting position, as illustrated in FIG. 5, so that the sensor 52 can start sensing the exterior dimensions of the metal blank 1. A sensing route of the sensor 52, as illustrated in FIG. 7, is utilized for sensing the metal blank 1 in a lateral moving manner. Next, the value of the size detected by the sensor 52 will be stored in the controller 51 for future use.

The inspection mechanism for metal blank of the present invention can be utilized to detect the exterior dimensions of the metal blank 1, such that the user may have a clear idea about the size deviation or error of the metal blank 1. Then the detected values of the size can be utilized for the correction or modification to the parameter setting in the subsequent processes, so as to enhance the quality consistency of the product.

One skilled in the art will understand that the embodiment of the present invention as shown in the drawings and described above is exemplary only and not intended to be limiting.

Objectives of the present invention are completely and effectively implemented. Notions of the functions and structures of the present invention have been shown and described in the embodiments, whereas implementations of the present invention may have modifications or changes in any ways without going against the above notions.

What is claimed is:

1. An inspection mechanism for metal blank, adapted for sensing the surface condition of a metal blank, comprising:
    a framework, comprising a platform and a foot unit arranged next to said platform;
    a holding device arranged on said platform for holding the metal blank;
    a shuffling device, comprising a lateral rail arranged on said foot unit, a perpendicular rail slidably arranged on said lateral rail, and a base arranged on said perpendicular rail; and
    a inductive control device, comprising a controller and a sensor arranged on said base, wherein said base is adaptable for controllably horizontally and vertically move along said lateral rail and said perpendicular rail, wherein said controller is electrically connected with said holding device, said base, and said sensor, so as to control the actuation of said holding device and the horizontal and vertical moving distance of said base and to record the value of the surface condition of the metal blank sensed by said sensor.

2. The inspection mechanism for metal blank, as recited in claim 1, wherein said holding device comprises a shelf arranged on said platform and a holder arranged under said shelf, wherein said shelf has four slots provided thereon, wherein said holder comprises a telescopic cylinder controlled by said controller and four holding posts driven by said telescopic cylinder to move to or from one another, wherein each said holding post protrudes from the surface of said shelf from one said slot respectively, wherein when the metal blank is placed on said shelf, said telescopic cylinder is adapted for driving said four holding posts to hold or release the metal blank.

* * * * *